(12) United States Patent
Noda

(10) Patent No.: US 7,957,638 B2
(45) Date of Patent: Jun. 7, 2011

(54) IMAGE PICKUP APPARATUS AND METHOD OF CONTROLLING THE SAME

(75) Inventor: Hiroshi Noda, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/572,678

(22) Filed: Oct. 2, 2009

(65) Prior Publication Data

US 2010/0086290 A1    Apr. 8, 2010

(30) Foreign Application Priority Data

Oct. 6, 2008  (JP) .................................. 2008-260177

(51) Int. Cl.
  *G03B 15/03*    (2006.01)
(52) U.S. Cl. ........................................ 396/177; 396/179
(58) Field of Classification Search .................. 396/177, 396/179
  See application file for complete search history.

(56) References Cited

U.S. PATENT DOCUMENTS

| | | | | |
|---|---|---|---|---|
| 5,557,366 A | * | 9/1996 | Hirai et al. ..................... | 396/159 |
| 5,754,897 A | * | 5/1998 | Suzuki et al. .................. | 396/177 |
| 6,374,051 B1 | * | 4/2002 | Yamane .......................... | 396/177 |
| 6,909,847 B2 | * | 6/2005 | Ujikane et al. ................. | 396/178 |
| 7,519,288 B2 | * | 4/2009 | Kim ................................. | 396/177 |
| 2002/0034383 A1 | * | 3/2002 | Kobayashi ..................... | 396/177 |
| 2008/0175579 A1 | * | 7/2008 | Kawakami ..................... | 396/155 |

FOREIGN PATENT DOCUMENTS

JP    2005-173467 A    6/2005

* cited by examiner

*Primary Examiner* — Rodney E Fuller
(74) *Attorney, Agent, or Firm* — Rossi, Kimms & McDowell LLP

(57) ABSTRACT

An image pickup apparatus which is capable of achieving excellent moving image shooting even when strobe popup is not successfully performed during moving image shooting. A camera implementing the image pickup apparatus has a strobe that shifts between a retracted position and a service position. When a motor for operating the camera performs reverse rotation, the strobe is driven to the service position. An MPU instructs the motor to drive the strobe to the service position, and determines, based on a signal from a popup position-detecting switch, whether or not the strobe has been normally driven to the service position. When the strobe has not been normally driven to the service position, the MPU performs error handling. The error handling is carried out differently between a case where moving image shooting is being performed and a case where the moving image shooting is not being performed.

7 Claims, 3 Drawing Sheets

IMAGE PICKUP APPARATUS AND METHOD OF CONTROLLING THE SAME

BACKGROUND OF THE INVENTION

1. Field of the Invention

The present invention relates to an image pickup apparatus equipped with a strobe configured to shift between a retracted position and a service position, and a method of controlling the strobe.

2. Description of the Related Art

Recently, some digital cameras have been provided with not only a function of performing still image shooting but also a function of performing moving image shooting. Among the digital cameras, many digital single-lens reflex cameras have a so-called popup strobe as an internal strobe which is popped up for use as required. The operation of the popup strobe is not necessitated for moving image shooting. However, in a digital single-lens reflex camera which is capable of temporarily stopping moving image shooting to thereby take a still image during the moving image shooting operation, a strobe is popped up when a photometry result that a strobe flash light is required for still image shooting is obtained.

When the strobe of the digital single-lens reflex camera is popping up, a sensor provided for preventing a camera shake detects mechanical vibration, which can cause an erroneous shake control operation. To solve this problem, Japanese Patent Laid-Open Publication No. 2005-173467 discloses processing to be executed to cause a shake preventing device to inhibit a shake control operation over a predetermined time period when the strobe is automatically popping up during moving image shooting.

To pop up a strobe during moving image shooting, there is employed one of the following two methods: a motor or the like is used to cause the strobe to automatically pop up; and a hook is disengaged to thereby manually pop up the strobe. However, in a case where the motor or the like is used to cause the strobe to automatically pop up, the popup driving can be hindered by some factor, which disables the strobe from popping up.

In the case of still image shooting, even if the strobe was not popped up, it is possible to perform error handling in a strobe drive failure-handling process and notify a photographer that the strobe could not be used though a strobe flash light was necessitated for shooting.

However, if the same processing as executed in still image shooting is performed during moving image shooting, the operability of the moving image shooting operation is adversely affected. More specifically, although it is possible to continue moving image shooting, an error indication is displayed, which makes it impossible to monitor display of a moving image being taken. Further, it may be required to carry out an operation for temporarily stop the moving image shooting operation so as to cause the digital camera to recover from the error state resultant from the popup failure.

SUMMARY OF THE INVENTION

The present invention makes it possible to achieve excellent moving image shooting even when strobe popup is not successfully performed during moving image shooting.

In a first aspect of the present invention, there is provided an image pickup apparatus comprising an image pickup element, a strobe configured to shift between a retracted position and a service position, a drive unit configured to drive the strobe to the service position, an instruction unit configured to instruct the drive unit to drive the strobe to the service position, a detector unit configured to detect whether the strobe has been normally driven to the service position, and an error handling unit configured to be operable when the detector unit detects that the strobe has not been normally driven to the service position, to perform error handling, wherein the error handling unit carries out the error handling differently between a case where moving image shooting for continuously recording an image signal continuously output from the image pickup element is being performed and a case where the moving image shooting is not being performed.

In a second aspect of the present invention, there is provided a method of controlling an image pickup apparatus including an image pickup element, a strobe configured to shift between a retracted position and a service position, and a drive unit configured to drive the strobe to the service position, comprising instructing the drive unit to drive the strobe to the service position, detecting whether the strobe has been normally driven to the service position, and performing error handling when it is detected that the strobe has not been normally driven to the service position, wherein the performing error handling includes carrying out error handling differently between a case where moving image shooting for continuously recording an image signal continuously output from the image pickup element is being performed and a case where the moving image shooting is not being performed.

According to the present invention, it is possible to achieve excellent moving image shooting even when popup of the strobe fails during moving image shooting.

Further features of the present invention will become apparent from the following description of an exemplary embodiment (with reference to the attached drawings).

DETAILED DESCRIPTION OF THE EMBODIMENTS

The present invention will now be described in detail below with reference to the accompanying drawings showing an embodiment thereof.

Figure 1A:
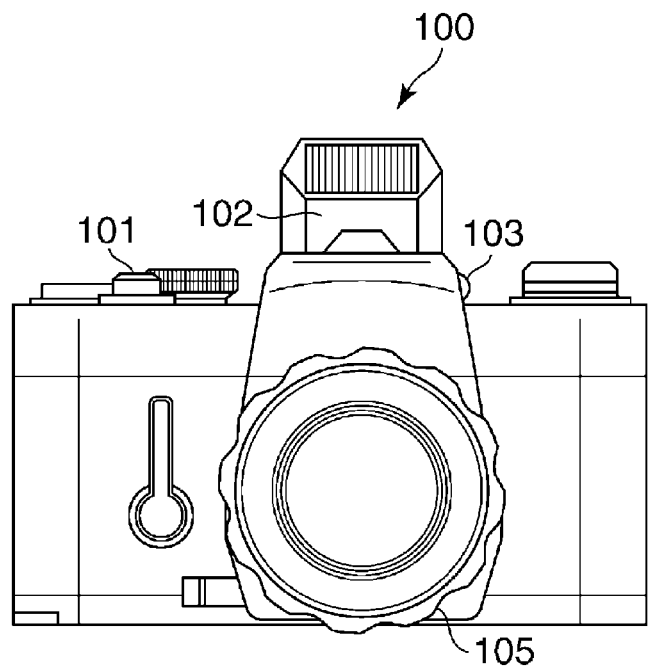
FIGS. 1A and 1B are views of the appearance of a camera according to an embodiment of the present invention.
Figure 1B:
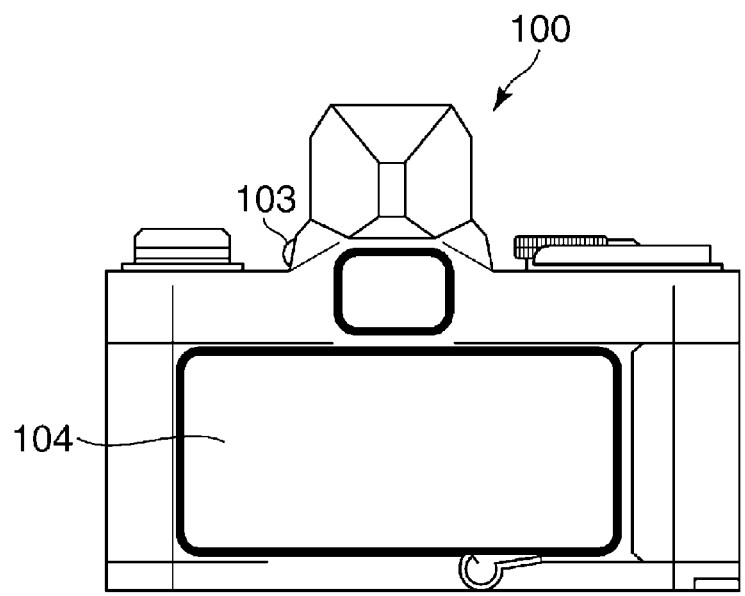

FIGS. 1A and 1B are views of the appearance of a camera (image pickup apparatus) according to the present embodiment. FIG. 1A is a front view of the camera, and FIG. 1B a rear view of the same.

As shown in FIGS. 1A and 1B, the camera 100 includes a release button 101, a strobe 102, a strobe-up button 103, a back display 104, and an anti-shake lens 105.

The release button 101 is a two-stage push switch. When the user half presses the release button 101, a first-stage switch (first switch) is turned on. Further, when the user fully presses the release button 101, a second-stage switch (second switch) is turned on.

The strobe 102 is a flash light emitting device. The strobe 102 is configured to be capable of shifting between a retracted position and a service position. The retracted position is defined as a position where the strobe 102 is in a down state and retracted in a camera body. In the camera of the present embodiment, the strobe 102 is configured to be retracted in the upper part of a pentaprism. On the other hand, the service position is defined as a position where the strobe 102 is in an up state and projected upward from the camera body.

The strobe-up button 103 is a push button-type switch for manually causing the strobe 102 to be projected, i.e. popped up.

The back display 104 is disposed as an image display unit on the rear surface of the body of the camera 100. The back display 104 displays a moving image being captured by the camera 100, various configuration menus in the GUI format, or photometric values and an operational status of the camera 100.

The anti-shake lens 105 is provided with an optical shake preventing device. The anti-shake lens 105 appearing in FIG. 1 is removably mounted on the body of the camera 100.

Figure 2:
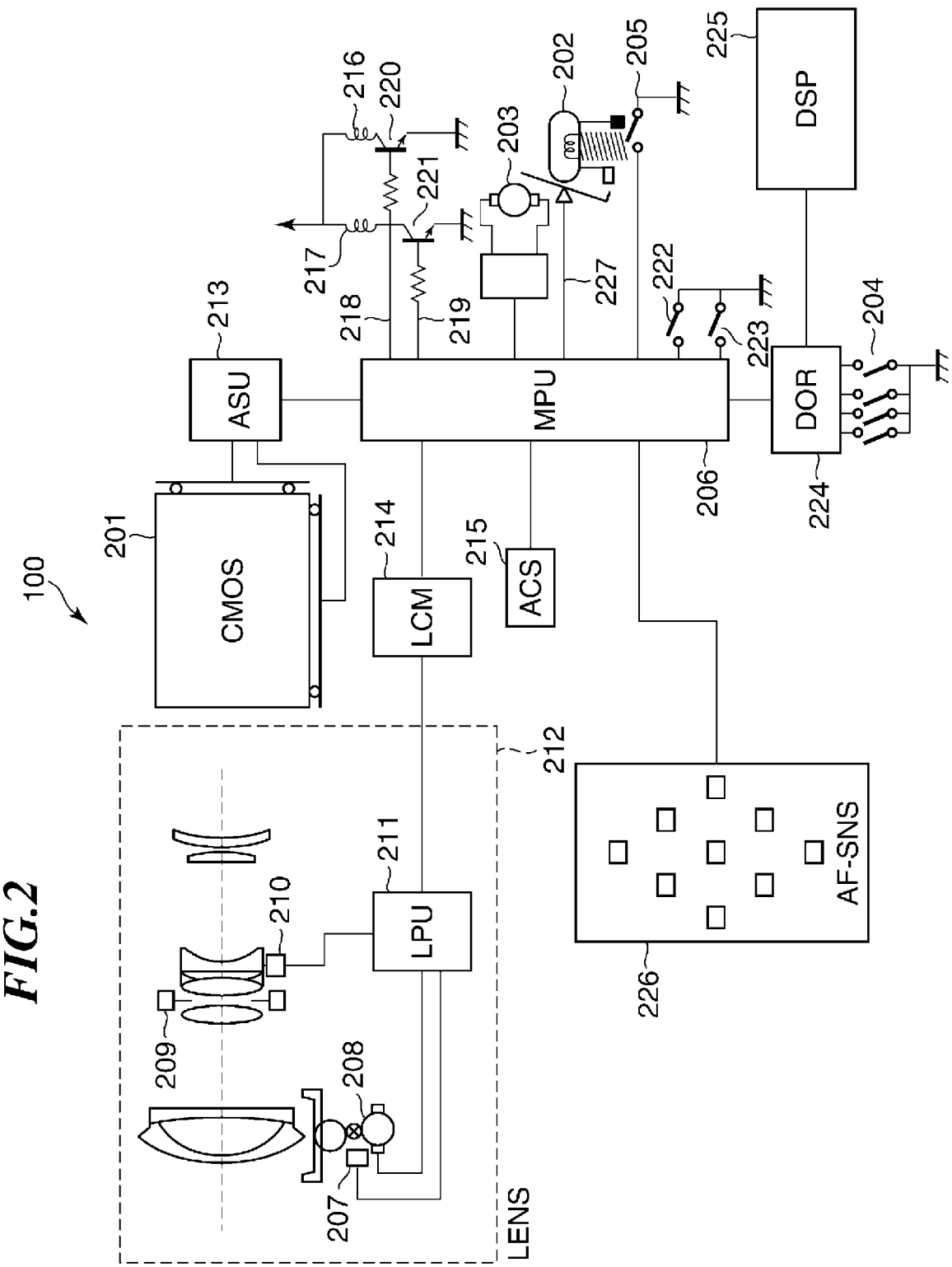
FIG. 2 is a circuit diagram of the camera according to the embodiment.

Next, the circuit of the camera according to the present embodiment will be described with reference to FIG. 2. FIG. 2 is a diagram of an example of a circuit of the camera according to the present embodiment.

The camera 100 includes a CMOS sensor 201, which is an image pickup element, an MPU 206, an AF (auto focus) sensor 226, and an interchangeable lens driver 214. The CMOS sensor 201 is held in a vertically and horizontally movable manner, and performs an anti-shake correction operation by being drivingly controlled by an anti-shake unit 213.

The MPU 206 is a microprocessor for controlling the camera 100. The MPU 206 in the present embodiment is a one-chip microcomputer integrating a nonvolatile memory, such as a ROM, a flash memory or an EEPROM, and a volatile memory, such as a RAM, and further incorporating various I/O circuits. Therefore, in FIG. 2, details of interfaces between the MPU 206 and the other circuits are omitted from illustration. For example, connection between the MPU 206 and the AF sensor 226 is indicated by a solid line, but in actuality, they are connected to each other by a serial communication interface.

The AF sensor (AF-SNS) 226 adjusts the focus. The AF sensor 226 is disposed on a plane positioned optically identical with an imaging surface, where a light flux divided from the light flux from a lens optical system forms an image. The AF sensor 226 operates under the control of the MPU 206 performed by serial communication. The AF sensor 226 transmits focus detection data which is used in phase difference AF, to the MPU 206 by serial communication.

The interchangeable lens driver (LCM) 214 under the control of the MPU 206 supplies electric power to the connection terminal of an interchangeable lens and relays serial communication.

The camera 100 of the present embodiment has an interchangeable lens 212 configured to be removably mounted thereon. In FIG. 2, a rectangular area enclosed by dotted lines represents the interchangeable lens 212. The interchangeable lens 212 corresponds to the anti-shake lens 105 in FIG. 1. The interchangeable lens 212 includes a diaphragm device 209, an optical shake-preventing driving device 210, a lens control microprocessor 211, a motor 208, and an encoder 207.

The diaphragm device (EDM: electromagnetic diaphragm) 209 controls an aperture.

The optical shake-preventing driving device (ISU) 210 moves a lens so as to prevent a camera shake, to thereby perform shake correction.

The lens control microprocessor (LPU) 211 controls the overall operation of the interchangeable lens 212.

The motor (LMTR) 208 drives a focusing lens.

The encoder (ENCF) 207 reads driving of lens by the motor 208.

Further, the camera 100 includes a display driver 224, a strobe popup switch 204, an image display unit 225, a first switch 222, and a second switch 223.

The display driver 224 drives the image display unit 225. The display driver 224 causes the image display unit 225 to display an image being captured by moving image shooting, or to display a message when an error occurs. The display driver 224 is controlled by communication from the MPU 206. Further, the display driver 224 is provided with switch input ports, not specifically denoted. Therefore, the display driver 224 is capable of notifying the MPU 206, through communication, of a switch detection state.

The strobe popup switch 204 is connected to the display driver 224. When the strobe-up button 103 in FIG. 1 is pressed by the user, the strobe popup switch 204 is turned on. When the strobe popup switch 204 is turned on, the display driver 224 notifies the MPU 206, through communication, of the switch detection state.

The image display unit (DSP) 225 is a touch panel type, and corresponds to the back display 104 in FIG. 1.

The first switch 222 corresponds to the first-stage switch of the release button 101 in FIG. 1.

The second switch 223 corresponds to the second-stage switch of the release button 101.

The first switch 222 and the second switch 223 are connected to respective interrupt ports of the MPU 206. This enables the MPU 206 to detect the ON/OFF of each of the first switch 222 and the second switch 223.

Furthermore, the camera 100 includes a motor 203, a first signal output port 218, a second signal output port 219, a first electromagnet 216, a second electromagnet 217, a strobe 202, a popup start-detecting switch 227, and a popup position-detecting switch 205.

The motor (MTR) 203 is used to operate the camera 100. The motor 203 is configured to normally rotate to thereby perform a shooting operation, and reversely rotate to thereby perform a strobe popup operation.

Each of the first signal output port (SMG1) 218 and the second signal output port (SMG2) 219 outputs a signal for controlling shutter movement. The first signal output port 218 is connected to the first electromagnet (MG1) 216 via an amplifier 220, while the second signal output port 219 is connected to the second electromagnet (MG2) 217 via an amplifier 221.

The strobe (POPST) 202 corresponds to the strobe 102 in FIG. 1. When the motor 203 performs reverse rotation, a hook holding the strobe 202 down is disengaged from the strobe 202, and the strobe 202 is popped up by the urging force of a spring. This mechanism for driving the strobe 202 to its service position corresponds to an example of a drive unit of the present invention.

The popup start-detecting switch (POPCTL) 227 is provided to detect the start of a popup of the strobe 202. The popup start-detecting switch 227 is held in contact with a motor driving phase substrate that delivers a signal which changes when the motor 203 rotates. The popup start-detecting switch 227 detects that the reverse rotation of the motor 203 has driven the hook holding the strobe 202 down until it is disengaged from the strobe 202.

The popup position-detecting switch (POPEND) 205 detects the popup position of the strobe 202. It takes several tens to one hundred and several tens of milliseconds for the urging force of the spring to complete the popup of the strobe 202 after the strobe 202 is disengaged from the hook. Now, it is required to take into consideration a situation where the strobe 202 to be popped up by the urging force of the spring remains held down e.g. due to existence of an obstacle to the popup of the strobe 202 in an upper part of the camera 100, and is disabled from popping up. Therefore, aside from the popup start-detecting switch 227, the popup position-detecting switch 205 is provided to detect a popup of the strobe 202 to its service position, i.e. the completion of a popup operation.

By combining the result of detection of the start of a popup operation by the popup start-detecting switch 227 and that of detection of a popup position by the popup position-detecting switch 205, it is possible to detect whether the strobe 202 has been normally driven to its service position by popup driving.

Figure 3:
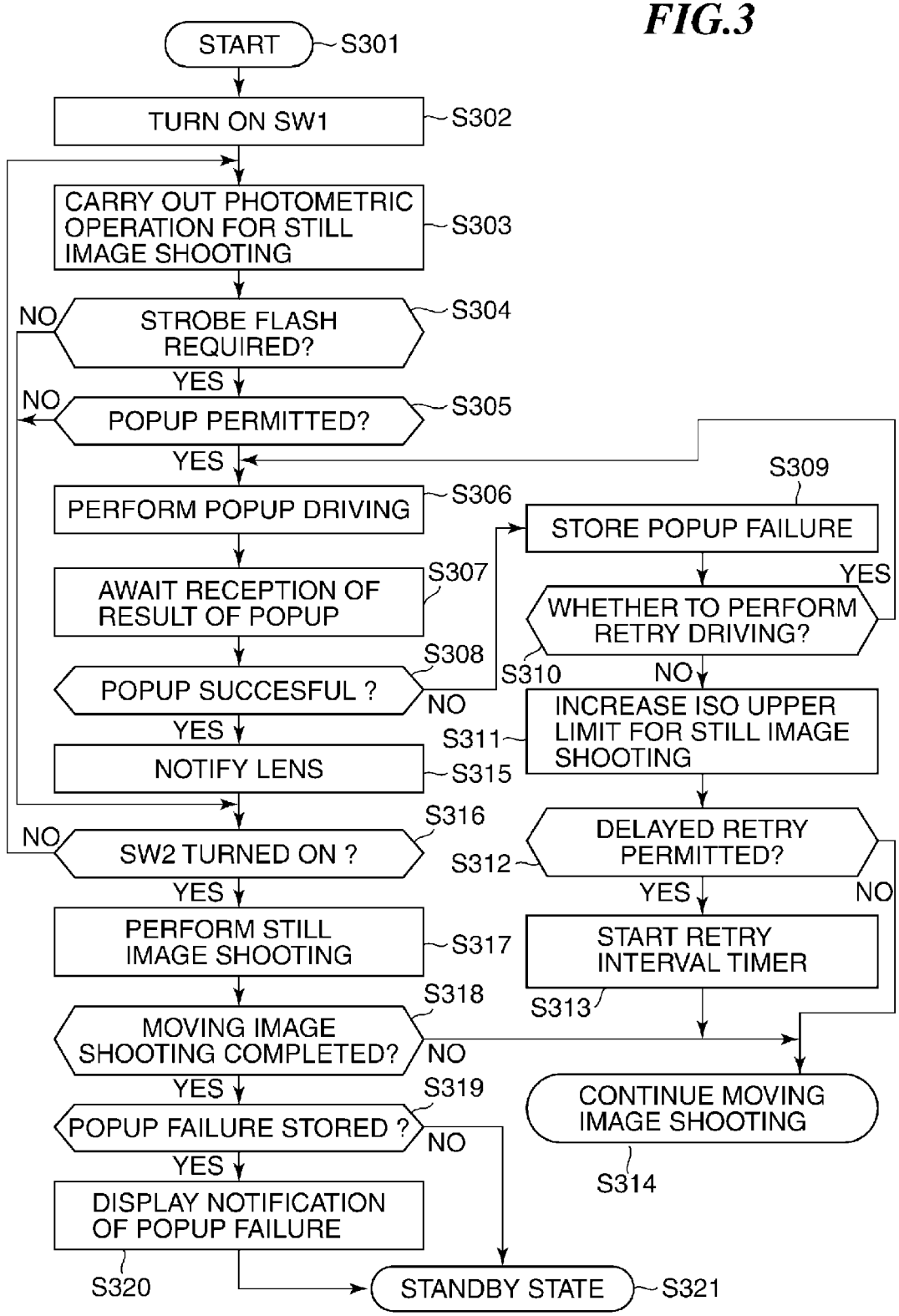
FIG. 3 is a flowchart of an operation process executed by the camera according to the embodiment.

Next, a sequence of operations for performing photometry for still image shooting during moving image shooting and carrying out automatic popup when a strobe flash light is needed will be described with reference to a flowchart shown in FIG. 3. An operation process of the flowchart in FIG. 3 is realized by operating various kinds of hardware connected to the I/O circuits of the MPU 206, based on a program stored in the ROM.

First, in a step S301, in the present example, it is assumed that the camera 100 has started moving image shooting, and the present process is started during execution of the moving image shooting. More specifically, in the present example, the camera 100 has started to be performing moving image shooting by continuously recording an image signal continuously output from an image pickup element. It is assumed here that the moving image shooting is processed by another task. Therefore, the flowchart in FIG. 3 shows a strobe popup process executed in response to a switch operation and the result of photometry performed during the moving image shooting, and a process for a task of generating an event as the outset of a still image shooting process.

In a step S302, the user half presses the release button 101 in FIG. 1 during the moving image shooting so as to perform still image shooting. When the release button 101 is half pressed, the MPU 206 detects that the first switch (SW1) 222 has been turned on.

Next, in a step S303, the MPU 206 performs a photometric operation for still image shooting. In the present example, the MPU 206 determines photometric values, such as an aperture value and a shutter speed, for use in the still image shooting, based on an output from the image pickup element and the like during the moving image shooting.

Next, in a step S304, the MPU 206 determines, based on the result of the operation in the step S303, whether or not the operation of the strobe 202 is needed. If it is configured that the strobe 202 is not automatically popped up depending on the photometric values, the MPU 206 may determine whether or not the strobe popup switch 204 as a strobe-up instruction button of the camera 100 has been turned on. If the operation of the strobe 202 is needed, the process proceeds to a step S305, whereas if not, the process proceeds to a step S316.

In the step S305, the MPU 206 determines whether or not to permit the strobe 202 to be popped up. Examples of cases where the strobe 202 is not permitted to be popped up include a case where it is not possible to pop up the strobe 202 due to failure in a strobe popup operation described hereinafter. If the strobe 202 is permitted to be popped up, the process proceeds to a step S306, whereas if not, the process proceeds to the step S316.

In the step S306, the MPU 206 generates an event for giving an instruction for driving the strobe 202 to pop up to a task of performing mechanical control. The motor 203 performs reverse rotation to drive the strobe 202 to pop up.

In a step S307, the MPU 206 receives a result of an operation for driving the strobe 202, i.e. information on whether or not the strobe 202 has been successfully popped up, from the task of performing mechanical control. More specifically, the MPU 206 receives information on whether or not the strobe 202 has been normally driven to its service position. In the present embodiment, if the strobe 202 has been normally popped up, the popup position-detecting switch 205 detects the popup position of the strobe 202 when a predetermined stabilization time period has elapsed after the popup start-detecting switch 227 is turned on. Therefore, the MPU 206 awaits reception of a signal from the above-mentioned popup position-detecting switch 205 for the stabilization time period.

In a step S308, the MPU 206 determines whether or not the strobe 202 is successfully popped up. If the signal from the popup position-detecting switch 205 indicates that the strobe 202 has been successfully popped up, the process proceeds to a step S315, whereas if the signal indicates that the popup of the strobe 202 is unsuccessful, the process proceeds to a step S309.

In the step S309, the MPU 206 stores information of popup failure e.g. in the memory thereof. Further, the MPU 206 counts the number of times of popup failure and stores the same.

Then, in a step S310, the MPU 206 determines whether or not to perform a retry driving operation for driving the strobe 202 again. If moving image shooting is not being performed and if the number of times of popup failure is not more than twice, the retry driving operation is performed. If the retry driving operation is to be performed, the process returns to the step S306. On the other hand, if the retry driving operation is not to be performed, the process proceeds to a step S311. In the present example, the camera 100 is assumed to be performing moving image shooting, so that the process proceeds to the step S311. The upper limit of the number of times of popup failure is not limited to twice, but it may be set e.g. as desired by the user.

In the step S311, the MPU 206 carries out processing for increasing the upper limit of the ISO setting for still image shooting. Here, the popup of the strobe 202 is assumed to be unsuccessful, so that it is impossible to perform stroboscopic photography for still image shooting. Therefore, the MPU 206 temporarily increases the ISO setting to a high sensitivity level so as to perform shooting under a brightest possible condition. It should be noted that when moving image shooting is not being performed, this processing is not executed, but the MPU 206 causes the image display unit 225 to display a message indicating that the popup of the strobe 202 is unsuccessful, or carries out error handling for temporarily inhibiting the operation of the camera 100.

In a step S312, the MPU 206 determines whether or not to permit a delayed retry operation. The permission of the delayed retry operation means "to permit a popup retry operation of the strobe 202 to be carried out not continuously, but at predetermined intervals". If the delayed retry operation is to be permitted, the process proceeds to a step S313, whereas if not, the process proceeds to a step S314.

In the step S313, the MPU 206 starts a timer for measuring an interval between delayed retry operations.

In the step S314, the MPU 206 continues the moving image shooting. Further, the MPU 206 terminates the sequence of popup processing operations while continuing the moving image shooting. As described above, if the popup of the strobe 202 for still image shooting performed during moving image shooting is unsuccessful, the MPU 206 continues the moving image shooting without displaying an error indication, differently from error handling in an ordinary still image shooting operation. In the present embodiment, a state in which the processing in the step S314 is completed corresponds to a state in which the process has returned to the step S301 in which the moving image shooting is being performed.

On the other hand, in the step S315, the MPU 206 notifies the lens control microprocessor 211 that vibration will occur due to popup driving of the strobe 202. Based on this notification, the lens control microprocessor 211 drives the optical shake-preventing driving device 210 to suppress an adverse influence exerted on formation of an image due to vibration caused by the popup driving of the strobe 202 during the moving image shooting. At the same time, the MPU 206 causes the anti-shake unit 213 to drivingly control the CMOS sensor 201 such that it performs an anti-shake correction operation to thereby prevent adverse influence from being exerted on the formation of the image due to the vibration caused by the popup driving of the strobe 202 during the moving image shooting.

Next, in the step S316, the MPU 206 determines whether or not the release button 101 has been fully pressed by the user, i.e. whether or not the second switch (SW2) 223 has been pressed. If the second switch 223 has been pressed, the process proceeds to a step S317, whereas if not, the process returns to the step S303.

In the step S317, the MPU 206 performs still image shooting. In this step, the MPU 206 generates an event for starting the still image shooting, apart from the moving image shooting. Processing for image acquisition is executed by operations of another task, and hence description thereof is omitted.

In a step S318, the MPU 206 determines whether or not the moving image shooting has been completed. If the moving image shooting has been completed, the process proceeds to a step S319, whereas if not, the process proceeds to the step S314.

In the step S319, the MPU 206 determines whether or not the memory stores information on a popup failure. If the memory stores information on a popup failure, the process proceeds to a step S320, whereas if not, the process proceeds to a step S321.

In the step S320, the MPU 206 causes the image display unit 225 to perform indication notifying that the popup driving of the strobe 202 was unsuccessful. Thus, the error indication is displayed after completion of the driving image shooting. Thereafter, the process proceeds to the step S321.

In the step S321, the MPU 206 returns to a standby state of the camera 100.

As described above, according to the present embodiment, in performing strobe popup driving during moving image shooting, when popup driving is unsuccessful, it is possible to give priority to the moving image shooting by inhibiting display of an error indication or execution of a retry operation after the popup failure. This makes it possible to achieve excellent moving image shooting even when strobe popup has not been successfully performed.

Further, when a strobe popup operation is performed during moving image shooting, or when strobe popup driving is performed due to necessity of a strobe light flash for still image shooting during moving image shooting, it is possible to prevent vibration due to the popup driving to thereby achieve excellent moving image shooting.

Although in the above-described embodiment, the lens 212 removably mounted on the camera 100 is used as a lens having an optical shake-preventing driving device, this is not limitative, but the lens may be integrated in the camera 100.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-260177, filed Oct. 6, 2008, which is hereby incorporated by reference herein in its entirety.

What is claimed is:

1. An image pickup apparatus comprising:
   an image pickup element;
   a light emitting unit configured to move between a retracted position and a light emitting position;
   an instruction unit configured to instruct said light emitting unit to be in the light emitting position;
   a detector unit configured to detect whether said light emitting unit is in the light emitting position; and
   an error handling unit configured to be operable when said detector unit detects that said light emitting unit is not in the light emitting position, to perform error handling,
   wherein said error handling unit carries out the error handling differently between a case where moving image shooting for continuously recording an image signal continuously output from said image pickup element is being performed and a case where the moving image shooting is not being performed.

2. The image pickup apparatus according to claim 1, wherein after completion of the moving image shooting, said error handling unit displays an error indication for notifying that said light emitting unit is in the light emitting position.

3. The image pickup apparatus according to claim 1, further comprising a changing unit configured to change an ISO setting, and
   wherein when said detector unit detects, during the moving image shooting, that said light emitting unit is in the light emitting position, said changing unit changes the ISO setting to a high sensitivity level.

4. The image pickup apparatus according to claim 1, further comprising a notification unit configured to notify a lens having an optical shake-preventing driving device that shake correction should be performed, and
   wherein when said detector unit detects that said light emitting unit is in the light emitting position, said notification unit notifies the lens that shake correction should be performed.

5. A method of controlling an image pickup apparatus including an image pickup element and a light emitting unit configured to move between a retracted position and an in-use position, comprising:
   instructing the light emitting unit to be in the light emitting position;
   detecting whether the light emitting unit is not in the light emitting position; and
   performing error handling when it is detected that the light emitting unit has not been normally driven to the light emitting position,
   wherein said performing error handling includes carrying out error handling differently between a case where moving image shooting for continuously recording an image signal continuously output from the image pickup element is being performed and a case where the moving image shooting is not being performed.

6. An image pickup apparatus comprising:

an image pickup element;

a light emitting unit configured to move between a retracted position and an light emitting position;

an instruction unit configured to instruct said light emitting unit to be in the light emitting position;

a detector unit configured to detect whether said light emitting unit is in the light emitting position; and an error handling unit configured to be operable when said detector unit detects that said light emitting unit is not in the light emitting position, to perform error handling, wherein said error handling unit carries out the error handling after completion of the moving image shooting in case when said detector unit detects that said light emitting unit is not in the light emitting position when moving image shooting for continuously recording an image signal continuously output from said image pickup element is being performed.

7. A method of controlling an image pickup apparatus including an image pickup element and a light emitting unit configured to move between a retracted position and an light emitting position, comprising:

instructing the light emitting unit to be in the light emitting position;

detecting whether the light emitting unit is not in the light emitting position; and performing error handling step when it is detected that the light emitting unit has not been normally driven to the light emitting position, wherein said performing error handling carries out the error handling after completion of the moving image shooting in case when it detects that said light emitting unit is not in the light emitting position when moving image shooting for continuously recording an image signal continuously output from said image pickup element is being performed.

* * * * *